US011022732B2

(12) United States Patent
Abe et al.

(10) Patent No.: US 11,022,732 B2
(45) Date of Patent: Jun. 1, 2021

(54) OPTICAL FILM FOR EYEWEAR, AND FUNCTIONAL FILM FOR EYEWEAR, OPTICAL LAMINATE FOR EYEWEAR, AND EYEWEAR WHICH HAVE SAME

(71) Applicant: NIPPON KAYAKU KABUSHIKI KAISHA, Tokyo (JP)

(72) Inventors: Saki Abe, Tokyo (JP); Yoshiyuki Yahagi, Tokyo (JP); Kouichi Tanaka, Tokyo (JP)

(73) Assignee: NIPPON KAYAKU KABUSHIKI KAISHA, Tokyo (JP)

( * ) Notice: Subject to any disclaimer, the term of this patent is extended or adjusted under 35 U.S.C. 154(b) by 254 days.

(21) Appl. No.: 15/982,018

(22) Filed: May 17, 2018

(65) Prior Publication Data

US 2018/0267219 A1 Sep. 20, 2018

Related U.S. Application Data

(63) Continuation of application No. PCT/JP2016/080423, filed on Oct. 13, 2016.

(30) Foreign Application Priority Data

Nov. 19, 2015 (JP) .............................. JP2015-226643

(51) Int. Cl.
*G02B 5/28* (2006.01)
*G02C 7/10* (2006.01)
(Continued)

(52) U.S. Cl.
CPC ................. *G02B 5/28* (2013.01); *G02B 5/20* (2013.01); *G02B 5/208* (2013.01); *G02B 5/26* (2013.01);
(Continued)

(58) Field of Classification Search
CPC . G02B 5/28; G02B 5/20; G02B 5/208; G02B 5/26; G02B 5/30; G02B 5/2016;
(Continued)

(56) References Cited

U.S. PATENT DOCUMENTS 10,120,206 B2 * 11/2018 Tanaka ................. G02B 5/3016
2004/0263736 A1 12/2004 Graham et al.
(Continued)

FOREIGN PATENT DOCUMENTS

CN 102967948 A 3/2013
GB 2 314 167 A 12/1997
(Continued)

OTHER PUBLICATIONS

Chinese Office Action dated Feb. 22, 2019 for corresponding Chinese Application No. 201680065449.3 and English translation.
(Continued)

*Primary Examiner* — Kristina M Deherrera
(74) *Attorney, Agent, or Firm* — Pearne & Gordon LLP

(57) ABSTRACT

The present disclosure provides an optical film for eyewear that allows, when used by a person feeling stressed, easy of production of a space having a color tone that the person psychologically feels healing, and a functional film for eyewear, an optical laminate, and eyewear that each include the optical film. The optical film for eyewear including an optical functional layer, and has that transmitted light from a light source of white light has a pale tone, is provided.

8 Claims, 2 Drawing Sheets

(51) Int. Cl.
*G02B 5/20* (2006.01)
*G02B 5/30* (2006.01)
*G02B 5/26* (2006.01)

(52) U.S. Cl.
CPC .............. *G02B 5/30* (2013.01); *G02B 5/3016* (2013.01); *G02C 7/10* (2013.01)

(58) Field of Classification Search
CPC .......... G02C 7/10; G02C 7/102; G02C 7/107; G02C 7/108; G02C 7/12
USPC ........................................................ 359/580
See application file for complete search history.

(56) References Cited

U.S. PATENT DOCUMENTS

| | | | |
|---|---|---|---|
| 2005/0078245 A1 | 4/2005 | Sasaki et al. | |
| 2006/0209238 A1 | 9/2006 | Shiraogawa et al. | |
| 2008/0278681 A1* | 11/2008 | Blum .................... | G02C 7/061 351/159.42 |
| 2011/0188115 A1 | 8/2011 | Sharp et al. | |
| 2012/0081623 A1* | 4/2012 | Yamaguchi .......... | H04N 13/341 349/15 |
| 2013/0141681 A1 | 6/2013 | Takahashi et al. | |
| 2015/0329413 A1* | 11/2015 | Beall ...................... | C03C 3/097 501/32 |
| 2015/0355395 A1 | 12/2015 | Kimura et al. | |
| 2018/0017780 A1* | 1/2018 | Kuboi .................... | G02C 7/104 |
| 2019/0033620 A1* | 1/2019 | Yahagi .................. | G02B 5/305 |

FOREIGN PATENT DOCUMENTS

| | | |
|---|---|---|
| JP | 2002-179668 A | 6/2002 |
| JP | 2003-315556 A | 11/2003 |
| JP | 2004-029824 A | 1/2004 |
| JP | 2004-326018 A | 11/2004 |
| JP | 2008-134618 | 6/2008 |
| JP | 2013-061653 A | 4/2013 |
| TW | 201222024 A | 6/2012 |
| TW | 201445190 A | 12/2014 |
| WO | 2014/115705 A1 | 7/2014 |
| WO | WO-2016002582 A1 * | 1/2016 ........... G02B 27/288 |

OTHER PUBLICATIONS

English translation Written Opinion for corresponding International Application No. PCT/JP2016/080423 dated Dec. 27, 2016.
International Preliminary Report on Patentability for corresponding International Application No. PCT/JP2016/080423 dated May 22, 2018.
International Search Report for corresponding International Application No. PCT/JP2016/080423 dated Dec. 27, 2016.
Written Opinion for corresponding International Application No. PCT/JP2016/080423 dated Dec. 27, 2016.
Monobe et al.; "Research on a healing color suitable for the cause of stress"; IPSJ Tohoku Branch SIG Technical Report; vol. 2012-4; dated Feb. 13, 2013.
Extended European Search Report dated May 22, 2019 for corresponding European Application No. 16866069.4.
University of Toledo; "People Who Wear Rose-colored Glasses See More, Study Shows"; Science Daily, Jun. 6, 2009, https://www.sciencedaily.com/releases/2009/06/090603103807.htm.
Taiwanese Office Action dated Jan. 14, 2020 for corresponding Taiwanese Application No. 105136678 and English translation.
Chinese Office Action dated Sep. 26, 2019 for corresponding Chinese Application No. 201680065449.3 and English translation.
"Colorimetry—Part 4: CIE 1976 L * a * b * color space"; Japanese Industrial Standards; 8781-4: 2013.
Chinese Office Action dated Apr. 17, 2020 for corresponding Chinese Application No. 201680065449.3 and English translation.
Notice of the Opinion on Examination dated Jun. 17, 2020 for corresponding Taiwanese Application No. 105136678 and English translation.
Rejection Decision dated Jun. 28, 2020 for corresponding Chinese Application No. 201680065449.3 and English translation.
Office Action dated Oct. 19, 2020 in the corresponding JP application No. 2017-551776 and English translation.
Rejection Decision dated Jul. 28, 2020 for corresponding Chinese Application No. 201680065449.3 and English translation (Corrected document date; previously submitted on Oct. 26, 2020).

* cited by examiner

OPTICAL FILM FOR EYEWEAR, AND FUNCTIONAL FILM FOR EYEWEAR, OPTICAL LAMINATE FOR EYEWEAR, AND EYEWEAR WHICH HAVE SAME

CROSS REFERENCE TO RELATED APPLICATIONS

This is a continuation application of International Patent Application No. PCT/JP2016/080423 filed Oct. 13, 2016, which claims the benefit of Japanese Patent Application No. 2015-226643 filed Nov. 19, 2015, the full contents of all of which are hereby incorporated by reference in their entirety.

BACKGROUND

Technical Field

The present disclosure relates to an optical film suitable for constituting eyewear such as glasses or sunglasses, and a functional film for eyewear, an optical laminate for eyewear, and eyewear including the optical film.

Description of the Related Art

Recently, there are many people feeling stressed about various matters in a so-called stressful society. As a way to reduce stress, for example, using a color that provides healing to people can be mentioned. As a color that people feeling stressed are healed, there is a color of pale tone as described in "Research on a healing color suitable for the cause of stress", IPSJ Tohoku Branch SIG Technical Report, Vol. 2012-4. The pale tone typically has relatively low saturation and high lightness, and it has been found that a color tone felt healing is different depending on the cause of stress and the color preference of individual.

Examples of methods of adopting a color that provides healing in a living space include a method of changing the wallpaper, furniture, interior in a room and clothes to the color of pale tone.

However, it is not easy to change the entire space to the color of pale tone, and thus, only limited changes such as changing the wallpaper or changing clothes have been possible.

On the other hand, sunglasses reduce brightness through lenses colored with a pigment or the like to reduce the amount of light incident on eyes through absorption by the pigment, thereby providing good visibility. In addition, for the design of the sunglasses, a multi-layered film is deposited on the surfaces of the lenses in some cases. Through the deposition of the multilayered film, reflected light in metallic colors of blue, green, and red can be seen on the surfaces of the sunglasses by others.

However, adjustment of light transmitted through sunglasses has been mainly focused on achieving a color same as that when seen with unaided eyes. No active discussion has been made on provision of a healing effect by changing the brightness or the color tone in a living space by light transmitted through sunglasses.

SUMMARY

The present disclosure is related to providing an optical film for eyewear which can easily produce a space having a color tone that a user psychologically feels healing, as well as to provide a functional film for eyewear, an optical laminate for eyewear, and eyewear that each include the optical film.

According to a first aspect of the present disclosure, an optical film for eyewear includes an optical functional layer, the optical film has that transmitted light from a light source of white light has a pale tone.

Further, it is preferable that the optical film has an L* value representing luminance being within a range between 70 and 100 inclusive by quantifying the color tone of the transmitted light based on an L*a*b* color system according to JIS Z 8781-4:2013.

Further, it is preferable that the optical film has a C* value representing saturation and calculated by substituting an a* value and a b* value representing chromaticity for formula (1) below being within a range between 1 and 35 inclusive by quantifying the color tone of the transmitted light based on an L*a*b* color system according to JIS Z 8781-4:2013:

$$C^* = [(a^*)^2 + (b^*)^2]^{1/2} \quad (1)$$

Further, it is preferable that the optical film has an a* value representing chromaticity being within a range between −15 and 5 inclusive and a b* value representing chromaticity being within a range between −20 and 0 inclusive by quantifying the color tone of the transmitted light based on an L*a*b* color system according to JIS Z 8781-4:2013.

A second aspect of the present disclosure, a functional film for eyewear includes the optical film according to the present disclosure and a polarizer.

A third aspect of the present disclosure, an optical laminate for eyewear includes the optical film according to the present disclosure or the functional film according to the present disclosure and two support bodies which are arranged in a positional relationship holding the optical film or the functional film from both surface sides.

Further, it is preferable that at least one of the two support bodies is formed by one or two or more materials selected from the group consisting of triacetylcellulose, polycarbonate, nylon resin, and cycloolefin polymer.

A forth aspect of the present disclosure, an eyewear includes the optical laminate according to the present disclosure.

Further, it is preferable that the eyewear further including a lens, wherein the optical laminate is arranged on one surface side or both surface sides of the lens.

The present disclosure can provide an optical film for eyewear which can easily produce a space having a color tone that a user psychologically feels healing as well as to provide a functional film for eyewear, an optical laminate for eyewear, and eyewear that each include the optical film.

DETAILED DESCRIPTION

[Optical Film for Eyewear]

Figure 1:
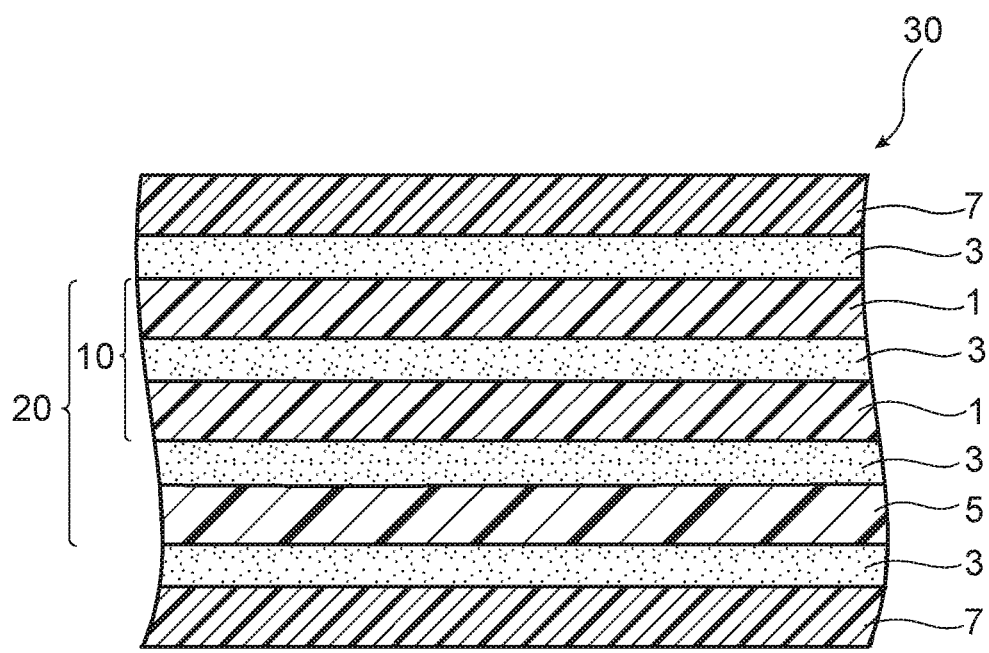
FIG. 1 is a schematic cross-sectional view showing an example of an optical laminate for eyewear including an optical film for eyewear according to the present disclosure.
Figure 2:
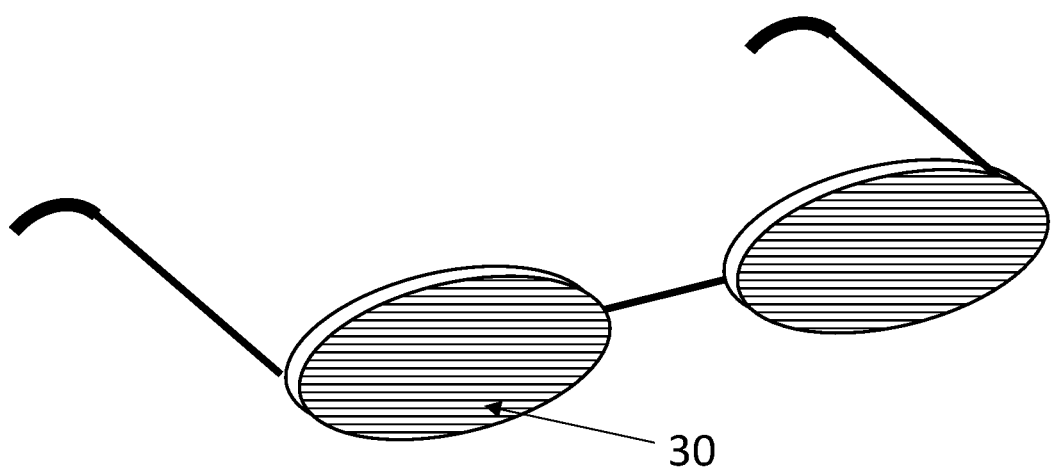
FIG. 2 is a schematic drawing of eyewear including an optical laminate according to the present disclosure.

An optical film for eyewear (hereinafter simply referred to as an "optical film") according to the present disclosure includes an optical functional layer, and the optical film has that transmitted light from a light source of white light has a pale tone. When used in eyewear such as sunglasses or glasses, such the optical film can easily produce a space having a color tone from which a user of the eyewear psychologically feels healing.

White light generally is light in which lights (colors) of all wavelengths in visible light are equally mixed and that provides no sense of color. However, in the present disclosure, white light includes bluish white light and yellowish white light and is preferably light having a color temperature of 4000 to 7000 Kelvin (K). Examples of such light include the sun light (natural light), light from a light source such as a light bulb, a fluorescence lamp, or an LED lamp, and standard light C (what is called C light source) standardized by CIE. The color tone (transmission color) of the transmitted light from a light source of white light is the color of light transmitted through the optical film from the light source of white light.

The pale tone is a color tone having high luminance and low saturation. Such a color tone is defined as p (pale) in the PCCS (Practical Color Co-ordinate System) tone. Pale tones that provide a healing effect focused on in the present disclosure are preferably p3, p4, p5, p6, p7, p8, p9, p10, p11, p12, p13, p14, p15, p16, p19, p20, p21, p22, p23, and p24 among the PCCS tones, more preferably p6, p10, p11, p12, p14, p15, p16, p19, p20, p22, and p24, in particular.

The color tone of the above-described transmitted light is quantified by the CIE (International Commission on Illumination) $L^*a^*b^*$ color system according to JIS Z 8781-4: 2013 as follows. Measurement conditions include the C light source (standard light C according to the CIE) and the visual field of 2 [degrees].

The $L^*$ value representing luminance is preferably within a range between 70 and 100 inclusive, more preferably falls within a range between 75 and 98 inclusive, further preferably falls within a range between 80 and 95 inclusive.

The $C^*$ value representing saturation and calculated by formula (1) below from the $a^*$ value and the $b^*$ value representing chromaticity is preferably within a range between 1 and 35 inclusive, more preferably within a range between 5 and 30 inclusive, further preferably within a range between 8 and 25 inclusive:

$$C^*=[(a^*)^2+(b^*)^2]^{1/2} \qquad (1)$$

The $a^*$ value representing chromaticity is preferably within a range between −15 and 5 inclusive, more preferably within a range between −12 and −5 inclusive. The $b^*$ value representing chromaticity is preferably within a range between −20 and 0 inclusive, more preferably within a range between −20 and −3 inclusive. In particular, the $a^*$ value representing chromaticity is preferably within a range between −15 and 5 inclusive, and the $b^*$ value representing chromaticity preferably falls within a range between −20 and 0 inclusive. The optical film according to the present disclosure, which can achieve transmitted light having such a color tone, provides a particularly high healing effect when used in eyewear such as sunglasses or glasses.

The optical film according to the present disclosure includes at least the optical functional layer. The optical film may include the single optical functional layer or the two or more laminated optical functional layers. When the two or more laminated optical functional layers are included, the optical functional layers may be of the same kind or may be of kinds different from each other. The number of laminated optical functional layers depends on the kinds of the optical functional layers and can be determined as appropriate so that the transmitted light through the entire lamination of the optical functional layers has a pale tone. The optical film according to the present disclosure may further include any other layer than the optical functional layers unless the color tone of the transmitted light is lost. Examples of layers other than the optical functional layers include a bonding agent layer, an adhesive agent layer, and a hard coat layer.

Each optical functional layer is not particularly limited as long as the optical functional layer achieves the color tone (hereinafter simply referred to as the "transmission color") of the transmitted light in a pale tone. Examples of the optical functional layers include a multi-layered film by pigment or metal evaporation coating, a resin multi-layered film having different refractive indexes, and a cholesteric liquid crystal layer that selectively reflects light in the visible light range, and these films may be used alone or a plurality thereof may be used in combination. It is preferable to use the cholesteric liquid crystal layer among these films because the transmission color can be easily adjusted only by changing the compounding ratio of materials and a desired transmission color can be achieved with a small number of layers.

The cholesteric liquid crystal layer can be formed by fixing the cholesteric orientation of a nematic liquid crystal compound in a liquid crystal composition. The liquid crystal composition includes at least the nematic liquid crystal compound having chirality, or the nematic liquid crystal compound and a chiral agent. A method of producing the cholesteric liquid crystal layer preferably includes at least, for example, a process of preparing the liquid crystal composition, a process of forming a coating film by applying the liquid crystal composition, a process of drying the coating film, and a process of curing the dried coating film.

In the process of preparing the liquid crystal composition, it is preferable to add a required amount of a right-handed or left-handed chiral agent to the nematic liquid crystal compound so that light having a desired wavelength is reflected. The helical orientation and reflected wavelength of a liquid crystal molecule can be optionally designed by selecting the kind and amount of the chiral agent. Subsequently, this mixture is dissolved into a solvent, and a photopolymerization initiator and an auxiliary agent are added to the mixture as necessary.

Unlike a liquid crystal that operates in an electric field, a nematic liquid crystal is used while the helical orientation thereof is fixed, and thus it is preferable to use, as the nematic liquid crystal compound, a nematic liquid crystal monomer containing a polymerizable group. The nematic liquid crystal monomer containing a polymerizable group is a compound containing the polymerizable group in a molecule and having liquid crystallinity in a temperature range or a concentration range. Examples of the polymerizable group include a (meth)acryloyl group, a vinyl group, a chalconyl group, a cinnamoyl group, and an epoxy group. It is preferable that a mesogenic group is contained in a molecule to have liquid crystallinity. The mesogenic group is a group capable of inducing liquid crystal phase behavior, and is, for example, a rod-shaped or plate-shaped substituent group such as a biphenyl group, a terphenyl group, a (poly)phenyl benzoate group, a (poly)ether group, a benzylideneaniline group, and an acenaphthoquinoxaline group, or a disk-shaped substituent group such as a triphenylene group, a phthalocyanine group, and an azacrown group. A liquid crystal compound containing a rod-shaped or plate-shaped group is known as a calamitic liquid crystal in this technical field. Specifically, examples of nematic liquid crystal monomers containing such a polymerizable group include polymerizable liquid crystals disclosed in Japanese Patent Application Laid-Open No. 2003-315556 and Japanese Patent Application Laid-Open No. 2004-29824, Paliocolor (registered trademark; omitted in the following) series (manufactured by BASF Japan Ltd.), and RMM series (manufactured by Merck KGaA). These nematic liquid crystal monomers containing a polymerizable group may be used alone or may be used in combinations of two or more.

The chiral agent is preferably a compound that is capable of causing right-handed or left-handed helical orientation of the above-described nematic liquid crystal monomer containing a polymerizable group and contains a polymerizable group like the nematic liquid crystal monomer containing a polymerizable group. Such a chiral agent is, for example, Paliocolor LC 756 (manufactured by BASF Japan Ltd.). The amount of the chiral agent added differs depending on the kind and reflected wavelength of the chiral agent, but is preferably 0.5 to 30 parts by mass approximately based on 100 parts by mass of the nematic liquid crystal monomer containing a polymerizable group, more preferably 1 to 20 parts by mass approximately.

In addition, a polymerizable compound that can react with the nematic liquid crystal monomer containing a polymerizable group and has no liquid crystallinity may be added to the liquid crystal composition. Such a compound is, for example, ultraviolet curable resin. Examples of the ultraviolet curable resin include dipentaerythritol hexa(meth) acrylate, a reaction product of dipentaerythritol penta(meth) acrylate and 1,6-hexamethylene-di-isocyanate, a reaction product of isocyanuric-ring-containing tri-isocyanate and pentaerythritol tri(meth)acrylate, a reaction product of pentaerythritol tri(meth)acrylate and isophorone-di-isocyanate, dipentaerythritol penta(meth)acrylate, dipentaerythritol tetra (meth)acrylate, pentaerythritol tetra(meth)acrylate, pentaerythritol tri(meth)acrylate, trimethylolpropane tri(meth) acrylate, ditrimethylolpropane tetra(meth)acrylate, tris (acryloxyethyl)isocyanurate, tris (methacryloxyethyl)isocyanurate, a reaction product of glycerol triglycidyl ether and (meth)acrylic acid, caprolactone denaturation tris (acryloxyethyl)isocyanurate, a reaction product of trimethylolpropane triglycidyl ether and (meth)acrylic acid, triglyceroldi-(meth)acrylate, a reaction product of propylene glycoldi-glycidyl ether and (meth)acrylic acid, polypropylene glycol-di-(meth)acrylate, tripropylene glycol-di-(meth)acrylate, polyethylene glycol-di-(meth)acrylate, tetraethylene glycol-di-(meth)acrylate, triethylene glycol-di-(meth)acrylate, pentaerythritol-di-(meth)acrylate, a reaction product of 1,6-hexanediol-di-glycidyl ether and (meth)acrylic acid, 1,6-hexanediol-di-(meth)acrylate, glycerol-di-(meth)acrylate, a reaction product of ethylene glycol-di-glycidyl ether and (meth)acrylic acid, a reaction product of diethylene glycol-di-glycidyl ether and (meth)acrylic acid, bis (acryloxyethyl)hydroxyethyl isocyanurate, bis (methacryloxyethyl)hydroxyethyl isocyanurate, a reaction product of bisphenol A-di-glycidyl ether and (meth)acrylic acid, tetrahydrofurfuryl (meth)acrylate, caprolactone denaturation tetrahydrofurfuryl (meth)acrylate, 2-hydroxyethyl (meth) acrylate, 2-hydroxypropyl (meth)acrylate, polypropylene glycol (meth)acrylate, polyethylene glycol (meth)acrylate, phenoxy hydroxypropyl (meth)acrylate, acryloyl morpholine, methoxy polyethylene glycol (meth)acrylate, methoxy tetraethylene glycol (meth)acrylate, methoxy triethylene glycol (meth)acrylate, methoxy ethylene glycol (meth)acrylate, methoxy ethyl (meth)acrylate, glycidyl (meth)acrylate, glycerol (meth)acrylate, ethyl carbitol (meth)acrylate, 2-ethoxyethyl (meth)acrylate, N,N-dimethylaminoethyl (meth)acrylate, 2-cyanoethyl (meth)acrylate, a reaction product of butyl glycidyl ether and (meth)acrylic acid, butoxy triethylene glycol (meth)acrylate, and butanediol mono(meth)acrylate. These resins may be used alone or may be used as a mixture of some of the resins. These ultraviolet curable resins having no liquid crystallinity need to be added in such an amount that the nematic liquid crystal monomer containing a polymerizable group does not lose liquid crystallinity, and the amount added is preferably 0.1 to 20 parts by mass based on 100 parts by mass of the nematic liquid crystal monomer containing a polymerizable group, more preferably 1.0 to 10 parts by mass approximately.

When the nematic liquid crystal monomer containing a polymerizable group and any other polymerizable compound is ultraviolet curable, it is preferable that a photopolymerization initiator is further added to the liquid crystal composition for ultraviolet curing. Examples of the photopolymerization initiator include 2-methyl-1-[4-(methylthio) phenyl]-2-morpholinopropane-1 (Irgacure (registered trademark; omitted in the following) 907 manufactured by BASF Japan Ltd.), 1-hydroxy cyclohexyl phenyl ketone (Irgacure 184 manufactured by BASF Japan Ltd.), 4-(2-hydroxyethoxy)-phenyl(2-hydroxy-2-propyl) ketone (Irgacure 2959 manufactured by BASF Japan Ltd.), 1-(4-dodecylphenyl)-2-hydroxy-2-methylpropan-1-one (Darocure (registered trademark; omitted in the following) 953 manufactured by Merck KGaA), 1-(4-isopropylphenyl)-2-hydroxy-2-methylpropan-1-one (Darocure 1116 manufactured by Merck KGaA), 2-hydroxy-2-methyl-1-phenylpropan-1-one (Irgacure 1173 manufactured by BASF Japan Ltd.), an acetophenone compound such as diethoxyacetophenone, benzoin, benzoin compounds such as benzoin methyl ether, benzoin ethyl ether, benzoin isopropyl ether, benzoin isobutyl ether, and 2,2-dimethoxy-2-phenylacetophenone (Irgacure 651 manufactured by BASF Japan Ltd.), benzophenone compounds such as benzoylbenzoic acid, methyl benzoylbenzoate, 4-phenylbenzophenone, hydroxybenzophenone, 4-benzoyl-4'-methyldiphenyl sulfide, and 3,3'-dimethyl-4-methoxybenzophenone (Kayacure MBP manufactured by Nippon Kayaku Co., Ltd.), and thioxanthone compounds such as thioxanthone, 2-chlorothioxanthone (Kayacure CTX manufactured by Nippon Kayaku Co., Ltd.), 2-methylthioxanthone, 2,4-dimethylthioxanthone (Kayacure RTX manufactured by Nippon Kayaku Co., Ltd.), isopropyl thioxanthone, 2,4-dichlorothioxanthone (Kayacure CTX manufactured by Nippon Kayaku Co., Ltd.), 2,4-diethylthioxanthone (Kayacure DETX manufactured by Nippon Kayaku Co., Ltd.), or 2,4-diisopropylthioxanthone (Kayacure DITX manufactured by Nippon Kayaku Co., Ltd.). The photopolymerization initiator is preferably, for example, Irgacure TPO, Irgacure TPO-L, Irgacure OXE01, Irgacure OXE02, Irgacure 1300, Irgacure 184, Irgacure 369, Irgacure 379, Irgacure 819, Irgacure 127, Irgacure 907, or Irgacure 1173 (all manufactured by BASF Japan Ltd.), more preferably, Irgacure TPO, Irgacure TPO-L, Irgacure OXE01, Irgacure OXE02, Irgacure 1300, or Irgacure 907. These photopolymerization initiator may be used alone or may be used as a mixture of some of the initiators at an optional ratio.

When a benzophenone compound or a thioxanthone compound is used as the photopolymerization initiator, an auxiliary agent may be additionally used to promote optical polymerization reaction. Examples of such an auxiliary agent include amine compounds such as triethanolamine, methyldiethanolamine, triisopropanolamine, n-butylamine, N-methyldiethanolamine, diethylaminoethyl methacrylate, Michler's ketone, 4,4'-diethylaminophenone, ethyl 4-dimethylaminobenzoate, (n-butoxy)ethyl 4-dimethylaminobenzoate, and isoamyl 4-dimethylaminobenzoate.

It is preferable that the amounts of the photopolymerization initiator and the auxiliary agent added are in such a range that the liquid crystallinity of the liquid crystal composition is not affected. The amount of the photopolymerization initiator added is preferably 0.5 to 10 parts by mass, more preferably 2 to 8 parts by mass approximately, based on 100 parts by mass of ultraviolet-curable compound in the liquid crystal composition. The amount of the auxiliary agent added to the liquid crystal composition is preferably 0.5 to 2 times larger than the mass of the photopolymerization initiator.

In addition, a solvent for dissolving the liquid crystal compound can be added to the liquid crystal composition. The solvent is, for example, cyclopentanone, toluene, or methyl ethyl ketone, and may be determined by the skilled person in the art as appropriate. It is preferable that the amount of the solvent added is 300 to 1000 parts by mass based on 100 parts by mass of total solid content of the liquid crystal composition.

Subsequently, in the process of forming the coating film by applying the liquid crystal composition, it is preferable to form the coating film by applying the liquid crystal composition prepared in this manner on a plastic substrate such as a PET film to have a thickness as uniform as possible.

In the process of drying the coating film of the liquid crystal composition, it is preferable to leave the coating film of the liquid crystal composition to stand for a constant time under such a temperature condition that the liquid crystal composition becomes a cholesteric liquid crystal on the substrate and oriented at a desired helical pitch while heating the coating film to remove the solvent. It is preferable that the temperature of the heating is within a range between 40 to 200° C. inclusive and the time of the heating is within a range between 1 to 7 minutes inclusive, but the temperature and time of the heating may be adjusted by the skilled person in the art as appropriate. The cholesteric liquid crystal can be uniformly oriented by performing orientation processing such as rubbing or stretching on the surface of a plastic film substrate before the application, and the haze value of the film can be reduced.

Then, in the process of curing the dried coating film, the dried coating film is irradiated with ultraviolet from, for example, a high-pressure mercury lamp while the orientation of the liquid crystal compound is held, thereby fixing the orientation. Accordingly, the cholesteric liquid crystal layer can be obtained. The cholesteric liquid crystal layer that reflects right-handed circularly polarized light is obtained when the chiral agent having right-handed helical orientation is selected. The cholesteric liquid crystal layer that reflects left-handed circularly polarized light is obtained when the chiral agent having left-handed helical orientation is selected.

The transmission color of the cholesteric liquid crystal layer is different depending on a reflected wavelength range. The reflected wavelength range is expressed by using a central reflected wavelength that is the central value of the reflected wavelength range. It is preferable to have the central reflected wavelength in the visible light range to have the transmission color in a pale tone. The central reflected wavelength is within a range between 400 nm to 800 nm inclusive, more preferably 410 to 780 nm inclusive, further preferably 430 to 700 nm inclusive, and is selected in accordance with a desired color tone as appropriate. For example, the transmission color is yellow for the central reflected wavelength of 450 nm, reddish violet for the central reflected wavelength of 550 nm, and light blue for the central reflected wavelength of 650 nm.

To achieve the transmission color in a pale tone by using the cholesteric liquid crystal layer, the transmissivity and reflected wavelength range of the cholesteric liquid crystal layer need to be adjusted so that desired luminance and saturation are obtained. Specifically, the transmissivity of the cholesteric liquid crystal layer can be adjusted by changing the thickness of the liquid crystal layer. To achieve the transmission color in a pale tone, the thickness of the cholesteric liquid crystal layer is preferably, for example, 0.3 to 7 µm, more preferably 0.5 to 5 µm approximately or smaller.

When the desired reflected wavelength range is wide, the adjustment of the reflected wavelength range can be performed by laminating a plurality of cholesteric liquid crystal layers having different reflected wavelength ranges. For example, the transmission color in light green can be obtained by laminating a cholesteric liquid crystal layer having a central reflected wavelength of 450 nm and a cholesteric liquid crystal layer having a central reflected wavelength of 650 nm. Thus, the optical film for eyewear may include a single cholesteric liquid crystal layer alone or a combination of a plurality of cholesteric liquid crystal layers having different transmission colors. The combination is not particularly limited, and various kinds of complicate transmission colors can be obtained with the combination. The number of cholesteric liquid crystal layers is adjusted in accordance with a desired transmission color as appropriate, and is, for example, one to five, preferably one or two.

The method of laminating cholesteric liquid crystal layers is not particularly limited, but it is preferable to laminate the layers by using an adhesive agent or a bonding agent. The adhesive agent is an acrylic or rubber adhesive agent, but is preferably the acrylic adhesive agent, which allows easy adjustment of bonding and holding properties. The bonding agent is an ultraviolet curable resin composition or a heat curable resin composition. When the bonding agent is an ultraviolet curable resin, a composition as a mixture of a plurality of monomers containing an acryloyl group or an epoxy group can be cured through ultraviolet irradiation together with a photopolymerization initiator, thereby achieving bonding. When the bonding agent is a heat curable resin composition, a composition as a mixture of a plurality of monomers containing an epoxy group can be cured through heating together with an acid catalyst, thereby achieving bonding. Alternatively, a composition of a plurality of monomers or polymers containing an amino group, a carboxyl group, or a hydroxyl group can be cured through heating together with a compound containing an isocyanate group or melamine, thereby achieving bonding.

An adhesive agent and a bonding agent in which pigments are dissolved may be used as the adhesive agent and the bonding agent for laminating cholesteric liquid crystal layers. Accordingly, the optical film for eyewear having a further complicate transmission color can be obtained.

[Functional Film for Eyewear]

A functional film for eyewear (hereinafter also simply referred to as a "functional film") includes the above-described optical film and a polarizer. Transmissivity can be reduced by laminating the polarizer on the above-described optical film, which allows further adjustment of luminance.

The polarizer is typically a PVA polarization film, and a production method thereof is not particularly limited, but the polarizer is manufactured by adsorbing a pigment such as iodine or dichromatic dye to a polymer film formed of polyvinyl alcohol (PVA) or derivative thereof and subjecting the film to uniaxial stretching orientation. The pigment is preferably the dichromatic dye in terms of thermal resistance, and particularly preferably direct dye made of azo dye containing a sulfonate group.

The method of laminating the above-described optical film and the polarizer is not particularly limited, but it is preferable to bond the above-described optical film and the polarizer to each other through a bonding layer such as the above-described adhesive agent or bonding agent to obtain high bonding power. The bonding layer may be any of a hot-melt bonding agent and a curable bonding agent. A bonding agent in which light modulation dye is dissolved may be used as the bonding agent for bonding the above-described optical film and the polarizer to each other.

[Optical Laminate for Eyewear]

An optical laminate for eyewear (hereinafter also simply referred to as "optical laminate") includes the above-described optical film or the above-described functional film, and two support bodies holding the above-described optical film or the above-described functional film from both surface sides.

Each support body may be made of highly transparent resin such as polycarbonate (PC), triacetylcellulose (TAC), nylon resin, or cycloolefin polymer. The two support bodies may be formed by the same material or different materials. At least one of the two support bodies is preferably formed of one or two or more materials selected from the group consisting of triacetylcellulose, polycarbonate, nylon resin, and cycloolefin polymer.

Each of the two support bodies is preferably bonded with the above-described optical film or the above-described functional film through a bonding agent layer. The bonding agent layer is not particularly limited but is preferably formed by the adhesive agent or bonding agent described above about the functional film for eyewear to obtain high bonding power. The bonding layer may be any of a hot-melt bonding agent and a curable bonding agent.

When such an optical laminate is used as eyewear, it is preferable that the optical laminate is shaped into a desired shape and fixed to a frame.

FIG. 1 is a schematic cross-sectional view showing an exemplary configuration of an optical laminate according to the present disclosure. As shown in FIG. 1, this optical laminate 30 according to the present disclosure includes a functional film 20 according to the present disclosure, and two support bodies 7 holding the functional film 20 from both surface sides, and these are laminated through an adhesive agent layer 3 or a bonding agent layer 3. The functional film 20 includes an optical film 10 according to the present disclosure and a polarizer 5, and these are laminated through the adhesive agent layer 3 or the bonding agent layer 3. The optical film 10 includes an optical functional layer 1, and in this embodiment, two optical functional layers 1 are laminated through the adhesive agent layer 3 or the bonding agent layer 3.

In FIG. 1, the two optical functional layer 1 may be of the same kind or may be of kinds different from each other. When the optical functional layers are of kinds different from each other, for example, one of the layers is a cholesteric liquid crystal layer (R) that reflects right-handed circularly polarized light, and the other is a cholesteric liquid crystal layer (L) that reflects left-handed circularly polarized light.

[Eyewear]

Eyewear includes the above-described optical laminate, and may further include a frame for fixing the optical laminate, and a lens as necessary. In particular, when the eyewear includes an optical laminate including a functional film, it is preferable that the optical film is fixed to the frame so that the optical film is positioned outside of the polarizer. When the eyewear includes a lens, it is preferable that the above-described optical laminate is arranged on one surface side or both surface sides of the lens. In such eyewear, for example, surface processing for hard coating, reflection prevention, and antifogging may be performed on an outer surface of the optical laminate as appropriate.

It is preferable that the eyewear is provided in a shape of, for example, sunglasses or goggles, but may be provided in any shape that covers part or the entire of eyesight. The eyewear can be used indoor and outdoor. Particularly when stressed, for example, a user can easily produce a space having a color tone that the user psychologically feels healing by wearing the eyewear according to the present disclosure, and can feel the healing through visual perception, thereby reducing the stress.

EXAMPLES

The present disclosure will be exemplarily described below in detail with reference to examples. In the examples, the word "parts" means "parts by mass".

<Preparation of Coating Solution (Liquid Crystal Composition)>

Coating solutions (Agents R) and (Agents L) were prepared by dissolving, into a solvent, a polymerizable liquid crystal monomer, a chiral agent, and a polymerization initiator in compositions listed in Tables 1 and 2 below.

TABLE 1

| COATING SOLUTIONS (AGENTS R) COMPOSITION TABLE | | | | | |
|---|---|---|---|---|---|
| | MATERIAL NAME | AMOUNT ADDED (PARTS BY MASS) | | | |
| MATERIAL (KIND) | (MANUFACTURER) | R1 | R2 | R3 | R4 |
| POLYMERIZABLE LIQUID CRYSTAL MONOMER | LC 242 (BASF JAPAN LTD.) | 20.00 | 20.00 | 20.00 | 20.00 |
| CHIRAL AGENT | LC 756 (BASF JAPAN LTD.) | 0.99 | 1.07 | 1.26 | 1.54 |
| POLYMERIZATION INITIATOR | Irgacure TPO (BASF JAPAN LTD.) | 1.00 | 1.00 | 1.00 | 1.00 |
| SOLVENT | CYCLOPENTANONE | 80.00 | 80.00 | 80.00 | 80.00 |

TABLE 2

| | COATING SOLUTIONS (AGENTS L) COMPOSITION TABLE | | | | |
|---|---|---|---|---|---|
| | MATERIAL NAME | AMOUNT ADDED (PARTS BY MASS) | | | |
| MATERIAL (KIND) | (MANUFACTURER) | L1 | L2 | L3 | L4 |
| POLYMERIZABLE LIQUID CRYSTAL MONOMER | LC 242 (BASF JAPAN LTD.) | 20.00 | 20.00 | 20.00 | 20.00 |
| CHIRAL AGENT | COMPOUND 1 DESCRIBED BELOW | 2.64 | 2.90 | 3.48 | 4.32 |
| POLYMERIZATION INITIATOR | Irgacure TPO (BASF JAPAN LTD.) | 1.00 | 1.00 | 1.00 | 1.00 |
| SOLVENT | CYCLOPENTANONE | 80.00 | 80.00 | 80.00 | 80.00 |

Chiral agent: compound 1 (Exemplary compound 2-1 disclosed in Japanese Patent Application Laid-Open No. 2002-179668)

[Chemical Formula 1]

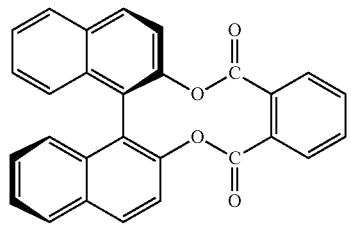

<Production of Optical Functional Layer>

Optical functional layers (R1 to 4 and L1 to 4) were produced in the following procedure by using the Coating solutions (R1 to 4 and L1 to 4) prepared in the above-described compositions listed in Tables 1 and 2. The following exemplary describes a case in which the Coating solution (R1) is used.

First, the Coating solution (R1) was applied on a PET film (manufactured by Toyobo Co., Ltd.; no undercoat layer) at room temperature by using a wire bar so that a film after drying has a thickness of 4 µm. Subsequently, the Coating solution (R1) applied on the PET film was heated at 150° C. for five minutes to remove the solvent, thereby obtaining a cholesteric liquid crystal layer. Then, the cholesteric liquid crystal layer was subjected to UV irradiation at power of 120 W for 5 to 10 seconds by a high-pressure mercury lamp (manufactured by HARISON TOSHIBA LIGHTING Corporation (currently, TOSHIBA Lighting & Technology Corporation)) to fix the cholesteric liquid crystal layer, thereby obtaining the optical functional layer (R1). Similarly, the optical functional layers (R2 to 4 and L1 to 4) were obtained through the above-described procedure by using the application liquids (R2 to 4 and L1 to 4).

Example 1

An optical film for eyewear according to Example 1 including the optical functional layer (R1) was acquired by peeling the optical functional layer (R1) produced through the above-described procedure from the PET film.

Example 2

An optical film for eyewear according to Example 2 including the optical functional layer (R2) was acquired by peeling the optical functional layer (R2) produced through the above-described procedure from the PET film.

Example 3

An optical film for eyewear according to Example 3 including the optical functional layer (R3) was acquired by peeling the optical functional layer (R3) produced through the above-described procedure from the PET film.

Example 4

An optical film for eyewear according to Example 4 including the optical functional layer (R4) was acquired by peeling the optical functional layer (R4) produced through the above-described procedure from the PET film.

Example 5

The optical functional layer (R1) and the optical functional layer (L1) produced through the above-described procedure were laminated on each other through an acrylic adhesive agent so that the optical functional layer sides face to each other. Thereafter, the PET films on both surfaces were peeled to acquire an optical film for eyewear according to Example 5 including the optical functional layer (R1) and the optical functional layer (L1).

Example 6

An optical film for eyewear according to Example 6 including the optical functional layer (R2) and the optical functional layer (L2) was acquired through an operation same as that of Example 5 except that the optical functional layers (R2) and (L2) produced through the above-described procedure were used in place of the optical functional layers (R1) and (L1).

Example 7

An optical film for eyewear according to Example 7 including the optical functional layer (R2) and the optical functional layer (R3) was acquired through an operation same as that of Example 5 except that the optical functional layers (R2) and (R3) produced through the above-described procedure were used in place of the optical functional layers (R1) and (L1).

Example 8

An optical film for eyewear according to Example 8 including the optical functional layer (R3) and the optical functional layer (R4) was acquired through an operation same as that of Example 5 except that the optical functional layers (R3) and (R4) produced through the above-described procedure were used in place of the optical functional layers (R1) and (L1).

Example 9

An optical film for eyewear according to Example 9 including the optical functional layer (R2) and the optical functional layer (R4) was acquired through an operation same as that of Example 5 except that the optical functional layers (R2) and (R4) produced through the above-described procedure were used in place of the optical functional layers (R1) and (L1).

Comparative Example 1

An optical film for eyewear according to Comparative Example 1 including the optical functional layer (R3) and the optical functional layer (L3) was acquired through an operation same as that of Example 5 except that the optical functional layers (R3) and (L3) produced through the above-described procedure were used in place of the optical functional layers (R1) and (L1).

Comparative Example 2

An optical film for eyewear according to Comparative Example 2 including the optical functional layer (R4) and the optical functional layer (L4) was acquired through an operation same as that of Example 5 except that the optical functional layers (R4) and (L4) produced through the above-described procedure were used in place of the optical functional layers (R1) and (L1).

[Observation of Color Tone of Transmitted Light]

The color tones (transmission color) of light transmitted through the optical films for eyewear produced in Examples 1 to 9 and Comparative Examples 1 and 2 were observed. Specifically, each optical film for eyewear was arranged at a distance of 1 to 3 cm approximately from eyes under a fluorescence lamp (LUPICA series EX-N manufactured by Mitsubishi Electric Corporation: Color temperature at 5000K), and the color tone thereof was evaluated by observing a white background screen through the optical film for eyewear. In the present examples, the color tone of the transmitted light was determined with reference to color samples in a PCCS color chart (Japan Color Research Institute PCCS harmonic color chart 201-L). The observed color tones (transmission colors) of the transmitted light are listed in Table 3 below.

[Measurement of L* Value, a* Value, and b* Value, and Calculation of C* Value]

The transmission spectra of the optical films for eyewear produced in Examples 1 to 9 and Comparative Examples 1 and 2 were measured by using a spectrophotometer MPC-3100 (manufactured by Shimadzu Corporation). Color calculation was performed by using the obtained spectra to obtain the L* value, the a* value, and the b* value, in an L*a*b* color system (a C light source and a visual field of 2 [degrees]) which are standardized by JIS Z 8781-4:2013. The C* value, which represents saturation, was calculated by substituting the a* value and the b* value, which represent chromaticity, into Expression (1) below. Obtained results are listed in Table 3 below.

$$C^* = [(a^*)^2 + (b^*)^2]^{1/2} \quad (1)$$

[Evaluation of Healing Effect]

Healing effects provided by the optical films for eyewear according to Examples 1 to 9 and Comparative Examples 1 and 2 were tested. Specifically, a total of nine monitors of men and women aged twenties to forties were asked to observe the color tones (transmission colors) of light transmitted through the optical films for eyewear and answer a questionnaire about whether the monitors provided the healing effect from each color tone. The transmission color of each optical film for eyewear was observed by seeing, for 10 to 20 seconds approximately, a view through the optical film for eyewear arranged at a distance of 1 to 3 cm approximately from eyes under the fluorescence lamp (described above). The ratio of monitors who answered that the healing effect was "provided" was calculated, and a result of the calculation was listed in Table 3 below. In the present examples, a case in which 33% or more (three or more out of nine) of the monitors replied that the healing effect was provided was determined to be at an acceptable level.

TABLE 3

| | | EVALUATION OF COLOR TONE OF TRANSMITTED LIGHT | | | | RATIO THAT HEALING EFFECT IS PROVIDED (%) |
|---|---|---|---|---|---|---|
| | COLOR (PCCS TONE) | L* VALUE | C* VALUE | a* VALUE | b* VALUE | |
| EXAMPLE 1 | PALE TONE (p14) | 92.9 | 9.4 | −8.8 | −3.5 | 100 |
| EXAMPLE 2 | PALE TONE (p15) | 89.5 | 15.0 | −11.8 | −9.2 | 78 |
| EXAMPLE 3 | PALE TONE (p23) | 86.2 | 25.9 | 23.5 | −10.9 | 33 |
| EXAMPLE 4 | PALE TONE (p9) | 94.5 | 26.4 | −9.6 | 24.6 | 44 |
| EXAMPLE 5 | PALE TONE (p14) | 92.1 | 10.3 | −9.6 | −3.9 | 78 |
| EXAMPLE 6 | PALE TONE (p15) | 87.1 | 26.9 | −23.8 | −12.4 | 33 |
| EXAMPLE 7 | PALE TONE (p19) | 83.3 | 19.5 | 3.0 | −19.3 | 78 |
| EXAMPLE 8 | PALE TONE (p3) | 83.3 | 19.5 | 16.6 | 10.2 | 44 |
| EXAMPLE 9 | PALE TONE (p11) | 91.2 | 31.7 | −23.4 | 21.4 | 56 |

TABLE 3-continued

| | EVALUATION OF COLOR TONE OF TRANSMITTED LIGHT | | | | | RATIO THAT HEALING EFFECT IS PROVIDED (%) |
|---|---|---|---|---|---|---|
| | COLOR (PCCS TONE) | L* VALUE | C* VALUE | a* VALUE | b* VALUE | |
| COMPARATIVE EXAMPLE 1 | VIVID TONE (v22) | 67.9 | 61.8 | 46.6 | −40.7 | 0 |
| COMPARATIVE EXAMPLE 2 | BRIGHT TONE (b9) | 93.0 | 76.1 | −19.3 | 73.6 | 0 |

(Note)
Items in the table which are underlined and bolded are items outside of the scope of application of the present invention, and are items whose evaluation results do not meet the acceptable level in the present examples.

As indicated in Table 3, the optical films for eyewear according to Comparative Examples 1 and 2 provided no healing effect to a user because the transmitted light thereof had no pale tone. However, it was confirmed that any of the optical films for eyewear according to Examples 1 to 9 of the present disclosure provided the healing effect to a user because the transmitted light thereof had a pale tone.

It was also found that the optical films for eyewear according to Examples 1, 2, 5, and 7 provided high healing effects to 70% or more of users because of the a* value ranging between −15 and 5 inclusive and the b* value ranging between −20 and 0 inclusive.

An optical film for eyewear according to the present disclosure, the transmitted light of which has a pale tone, allows easy production of a space having a color tone that user(s) psychologically feel(s) healing. Thus, a functional film for eyewear, an optical laminate, and eyewear that each include such an optical film for eyewear according to the present disclosure can provide a healing effect to a user through visual perception, thereby reducing any stress on the user.

What is claimed is:

1. An optical film for eyewear comprising an optical functional layer, wherein
    the optical functional layer includes a cholesteric liquid crystal layer having fixed orientation,
    an L* value representing luminance is within a range between 70 and 100 inclusive by quantifying a color tone of transmitted light from a light source of white light through the optical film based on an L*a*b* color system according to JIS Z 8781-4:2013, and
    the white light is standard light C standardized by CIE.

2. The optical film for eyewear according to claim 1, wherein a C* value representing saturation and calculated by substituting an a* value and a b* value representing chromaticity for formula (1) below is within a range between 1 and 35 inclusive by quantifying the color tone of the transmitted light based on an L*a*b* color system according to JIS Z 8781-4:2013:

$$C^* = [(a^*)^2 + (b^*)^2]^{1/2} \quad (1).$$

3. The optical film for eyewear according to claim 1, wherein an a* value representing chromaticity is within a range between −15 and 5 inclusive and a b* value representing chromaticity is within a range between −20 and 0 inclusive by quantifying the color tone of the transmitted light based on an L*a*b* color system according to JIS Z 8781-4:2013.

4. A functional film for eyewear comprising the optical film according to claim 1, and a polarizer.

5. An optical laminate for eyewear comprising:
    the optical film according to claim 1; and
    two support bodies which are arranged in a positional relationship holding the optical film front face and back face sides of the optical film.

6. The optical laminate for eyewear according to claim 5, wherein at least one of the two support bodies is formed by one or two or more materials selected from the group consisting of triacetylcellulose, polycarbonate, nylon resin, and cycloolefin polymer.

7. Eyewear comprising the optical laminate according to claim 5.

8. The eyewear according to claim 7, further comprising a lens, wherein the optical laminate is arranged on one surface side or both surface sides of the lens.

* * * * *